Nov. 10, 1931.  E. HORBER  1,831,178

BAIT

Filed March 14, 1929

E. Horber
INVENTOR

By: Marts &Clum
Attys.

Patented Nov. 10, 1931

1,831,178

UNITED STATES PATENT OFFICE

ERNST HORBER, OF ENNETBADEN, SWITZERLAND

BAIT

Application filed March 14, 1929, Serial No. 347,081, and in Switzerland March 20, 1928.

This invention relates to a fishing bait of the Devon type, which is distinguished by the fact that it comprises an elongated body tapering towards both ends, the external surface of which is formed of surface elements coiled spirally round the longitudinal axis of the body, and which are brought into contrast with one another by colouring and lustre, so that when the body rotates in the usual manner a striking play of light and colour is produced and a proper movement of the bait in the direction of its longitudinal axis is simulated which is clearly perceptible as the bait floats in a stationary position in the current, whereby the strength and force of the attractive effect exerted upon the fish of prey is substantially increased.

The invention is illustrated by way of example in two constructional forms in the accompanying drawings, in which:—

Figure 1:
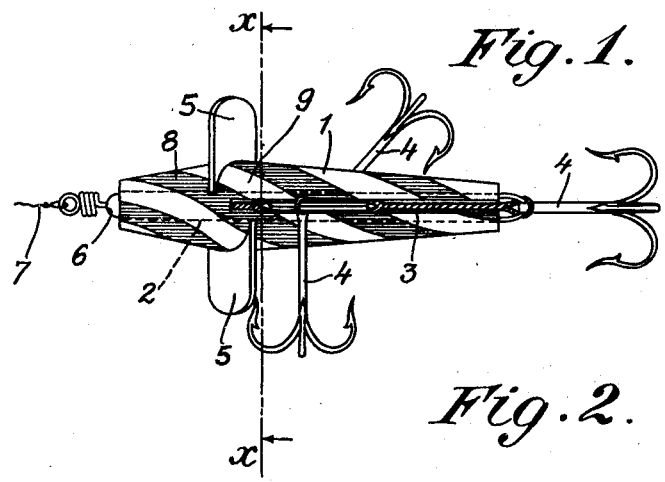
Figure 1 is a plan of the first constructional form.
Figure 2:
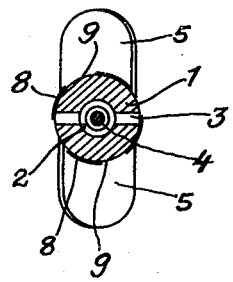
Figure 2 is a cross section on the line $x$—$x$ in Figure 1.

In Figures 1 and 2, 1 denotes a double frusto conical bait body with a longitudinal bore 2, and a longitudinal slot 3 extending along part of its length for the reception of the mounting 4, and with two vanes 5 which impart to the body 1 a rotation about its axis when the bait is pulled by the fishing line 7 secured to the swivel 6. The external surface of the body 1 is sub-divided into spiral surface elements 8 and 9 by painting or coating it with different colours. Thus, for example, the horizontally hatched surface elements 8 may be coated with red enamel lacquer and the unhatched surface elements 9 silvered.

Now when the body rotates, owing to the contrast effect of the surface elements 8 and 9, an animated play of colour is produced and owing to the spiral curving of the surface elements a proper movement of the bait in the direction of its longitudinal axis similar to the movement of small fishes is simulated, the strength and force of the attractive effect of the bait being even quite considerably enhanced in turbid water. By a lively play of colour with rapid rotation of the bait, the mounting of fish hooks is most advantageously masked. The bait described is, therefore, very effective. Mis-directed bites upon the lead weighting are precluded since no such weighting is provided.

The surface elements may be polished and the pitch of the spirally coiled surface elements equals substantially the different diameters of the body of the bait, whereby the above mentioned proper movement, simulated when the bait rotates, in the direction of the longitudinal axis becomes even more deceptive and the attractive effect upon the fish of prey is thereby further increased.

Figure 3:
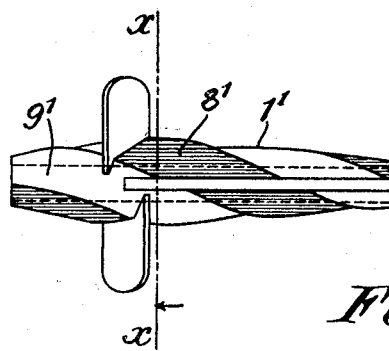
Figures 3 and 4 are similar views of the second constructional form without the fittings.
Figure 4:
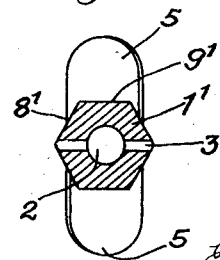

In the example illustrated in Figures 3 and 4 the body $1^1$ of the bait is constructed as a double truncated pyramid and the surfaces $8^1$ and $9^1$ of the pyramid are coiled spirally round the axis of the body $1^1$. These surface elements also are coated with different enamel colours or silvered or polished.

What I claim is:—

A bait of the Devon type for fish of prey, comprising a body having an outer smooth surface formed of spirally coiled surface elements of contrasting color and lustre, the pitch of which varies substantially as the diameter of the body of the bait whereby to simulate a proper movement of the bait in the direction of the axis of rotation and to considerably increase the attractive and deceiving effect on the fish.

In testimony whereof I have affixed my signature.

ERNST HORBER.